J. KIEL.
LISTER HARROW.
APPLICATION FILED JULY 11, 1913.
1,081,386.
Patented Dec. 16, 1913.
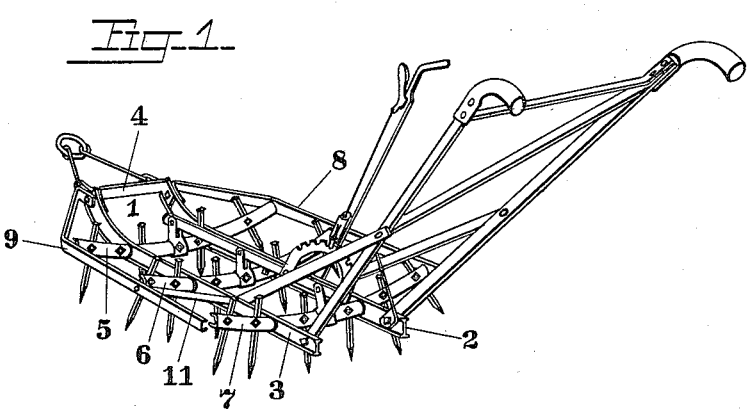
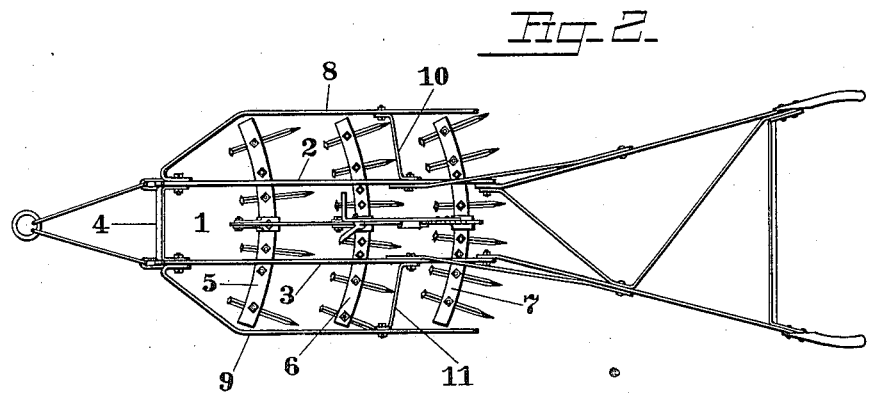

UNITED STATES PATENT OFFICE.

JOHN KIEL, OF MOLINE, ILLINOIS, ASSIGNOR TO DEERE & COMPANY, OF MOLINE, ILLINOIS, A CORPORATION OF ILLINOIS.

LISTER-HARROW.

1,081,386.  Specification of Letters Patent.  Patented Dec. 16, 1913.

Application filed July 11, 1913. Serial No. 778,586.

*To all whom it may concern:*

Be it known that I, JOHN KIEL, a citizen of the United States, residing at Moline, in the county of Rock Island and State of Illinois, have invented certain new and useful Improvements in Lister-Harrows, of which the following is a specification, reference being had therein to the accompanying drawing.

My invention relates to an improvement in harrows, more particularly of that type known as lister harrows employed in cultivation between rows of growing plants.

The object of my invention is to provide means for the better protection of plant growth against possible injury during cultivation.

Referring to the drawings in which similar numerals indicate identical parts—Figure 1 is a perspective view of a harrow embodying my improvements, and Fig. 2 is a plan view of Fig. 1.

The harrow frame 1 is composed of side-bars 2 and 3 inclined upwardly at their forward ends and connected by a cross-bar 4 which may be integral with the side bars 2 and 3 or formed separately as shown. The tooth-bars 5, 6 and 7 are rockably mounted on the side-bars 2 and 3, beyond which they project, and are bent to conform approximately to the cross ground line between vegetation cultivated in rows; consequently the end portions of the tooth-bars 5, 6 and 7, are in a higher plane than the side-bars 2 and 3.

To prevent injury to the plants, between rows of which the harrow is used, I provide fender-bars 8 and 9, one on each side of the harrow, secured forwardly to the side-bars 2 and 3 and projecting outwardly therefrom to clear the ends of the tooth-bars, and extended rearwardly parallel with the side bars 2 and 3 and substantially in the same plane with the ends of the tooth-bars 5, 6, and 7. Braces 10 and 11 are rigidly secured to the side-bars 2 and 3 and the fender-bars 8 and 9 supporting the latter firmly in position. Plow-handles are secured and braced on the rear of the harrow-frame 1, and a suitable draft device is provided at the forward end of the frame.

What I claim is—

1. In a lister-harrow, the combination of a frame having side-bars, tooth-carrying bars mounted on the side-bars and having their ends in a plane higher than the side-bars, and fender-bars secured to the frame and in the same plane as the ends of the tooth-carrying bars.

2. In a lister-harrow, the combination of a frame having side-bars, tooth-carrying bars mounted on the side bars and having their ends in a plane higher than the side bars, and fender-bars secured to the frame parallel with the side-bars, and in the same plane as the ends of the tooth-carrying-bars.

3. In a lister-harrow, the combination of a frame having side-bars, tooth-carrying bars mounted on the side-bars and having their ends in a plane higher than the side-bars, fender-bars secured forwardly to the frame, and braces secured to said side-bars and fender-bars and supporting the latter in the same plane as the ends of the tooth-carrying bars.

In testimony whereof I affix my signature, in presence of two witnesses.

JOHN KIEL.

Witnesses:
MARTIN PETERSON,
W. G. DUFFIELD.

---

Copies of this patent may be obtained for five cents each, by addressing the "Commissioner of Patents, Washington, D. C."